(12) United States Patent
Hamaguchi et al.

(10) Patent No.: US 11,772,329 B2
(45) Date of Patent: Oct. 3, 2023

(54) INPUT DATA CREATION DEVICE FOR POWDER ADDITIVE MANUFACTURING

(71) Applicant: Hitachi, Ltd., Tokyo (JP)

(72) Inventors: Takashi Hamaguchi, Tokyo (JP); Makoto Onodera, Tokyo (JP); Masayuki Hariya, Tokyo (JP); Zixian Zhang, Tokyo (JP); Shingo Noro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 767 days.

(21) Appl. No.: 16/648,754

(22) PCT Filed: Jul. 18, 2018

(86) PCT No.: PCT/JP2018/026916
§ 371 (c)(1),
(2) Date: Mar. 19, 2020

(87) PCT Pub. No.: WO2019/064834
PCT Pub. Date: Apr. 4, 2019

(65) Prior Publication Data
US 2020/0269509 A1  Aug. 27, 2020

(30) Foreign Application Priority Data
Sep. 28, 2017 (JP) .................... 2017-187400

(51) Int. Cl.
*B29C 64/386* (2017.01)
*B33Y 50/00* (2015.01)
(Continued)

(52) U.S. Cl.
CPC ........... *B29C 64/386* (2017.08); *B22F 10/00* (2021.01); *B22F 10/28* (2021.01); *B22F 10/47* (2021.01);
(Continued)

(58) Field of Classification Search
CPC ..... B29C 64/386; B29C 64/40; B29C 64/153; B22F 10/00; B22F 10/80; B22F 10/85;
(Continued)

(56) References Cited

U.S. PATENT DOCUMENTS 8,116,840 B2 * 2/2012 Feldman ............ A61B 5/14532
600/347
2015/0137423 A1   5/2015 Ding
(Continued)

FOREIGN PATENT DOCUMENTS

| JP | 2007-062050 A |   | 3/2007 |
|----|---------------|---|--------|
| JP | 2007062050 A  | * | 3/2007 |

(Continued)

OTHER PUBLICATIONS

Japanese Office Action received in corresponding Japanese Application No. 2019-544319 dated Sep. 29, 2020.
(Continued)

*Primary Examiner* — Thomas C Lee
*Assistant Examiner* — Michael Tang
(74) *Attorney, Agent, or Firm* — MATTINGLY & MALUR, PC

(57) ABSTRACT

An input data creation device for powder additive manufacturing that can design and provide an appropriate support that avoids manufacturing failure. The device creates input data of a model in which a support is provided to a manufacturing designed object in powder additive manufacturing. The device includes a mechanical quantity calculation unit including a mechanism configured to calculate a mechanical quantity generated on a surface to which the support is provided in the manufacturing designed object; and a support shape determination unit including a mechanism configured to determine, based on information on a plurality of types of support shapes, information on an
(Continued)

allowable mechanical quantity defined for each support shape, and a mechanical quantity calculated by the mechanical quantity calculation unit, an optimized support shape having an allowable mechanical quantity equal to or greater than the calculated mechanical quantity from among the plurality of types of support shapes.

5 Claims, 8 Drawing Sheets

(51) Int. Cl.
| | |
|---|---|
| *G05B 19/4097* | (2006.01) |
| *B29C 64/40* | (2017.01) |
| *B22F 10/00* | (2021.01) |
| *B22F 10/80* | (2021.01) |
| *B22F 10/85* | (2021.01) |
| *B22F 10/28* | (2021.01) |
| *B22F 10/47* | (2021.01) |
| *B29C 64/153* | (2017.01) |
| *B22F 10/38* | (2021.01) |

(52) U.S. Cl.
CPC .............. *B22F 10/80* (2021.01); *B22F 10/85* (2021.01); *B29C 64/40* (2017.08); *B33Y 50/00* (2014.12); *G05B 19/4097* (2013.01); *B22F 10/385* (2021.01); *B29C 64/153* (2017.08); *G05B 2219/49023* (2013.01)

(58) Field of Classification Search
CPC .... B22F 12/00; B22F 10/385; B22F 2999/00; B22F 10/28; B22F 10/47; B33Y 50/00; G05B 19/4097; G05B 2219/49023; Y02P 10/25

USPC .................................................. 700/98; 29/97
See application file for complete search history.

(56) References Cited

U.S. PATENT DOCUMENTS

| | | | |
|---|---|---|---|
| 2016/0368224 A1 | 12/2016 | Ooba et al. | |
| 2017/0326752 A1* | 11/2017 | Osawa | ................... B29C 64/40 |
| 2018/0056595 A1* | 3/2018 | Sterenthal | .............. B33Y 10/00 |
| 2019/0095842 A1* | 3/2019 | Brousseau | ................ G06N 7/08 |
| 2019/0266656 A1* | 8/2019 | Watkins | ............. G06Q 30/0631 |

FOREIGN PATENT DOCUMENTS

| | | | | |
|---|---|---|---|---|
| JP | 2012-101445 A | | 5/2012 | |
| JP | 2015-98165 A | | 5/2015 | |
| JP | 2015098165 A | * | 5/2015 | .......... B29C 33/306 |
| JP | 2015-202625 A | | 11/2015 | |
| JP | 2015-214104 A | | 12/2015 | |
| JP | 2015214104 A | * | 12/2015 | |
| JP | 2016-107638 A | | 6/2016 | |
| JP | 2017179517 A | * | 10/2017 | |
| WO | 2014/208743 A1 | | 12/2014 | |

OTHER PUBLICATIONS

International Search Report of PCT/JP2018/026916 dated Sep. 11, 2018.

Japanese Office Action received in corresponding Japanese Application No. 2019-544319 dated Dec. 1, 2020.

* cited by examiner

INPUT DATA CREATION DEVICE FOR POWDER ADDITIVE MANUFACTURING

TECHNICAL FIELD

The present invention relates to a technique of additive manufacturing, and particularly relates to an input data creation device for powder additive manufacturing.

BACKGROUND ART

In recent years, 3D manufacturing technology (so-called 3D printing) called Additive Manufacturing has attracted attention as a technology for manufacturing an end product having a complex shape in a near-net shape, and various research and development have been actively conducted. In additive manufacturing of a metal material, a method of manufacturing (for example, a powder bed fusion bonding method or a directional energy deposition method) by melting and bonding a powder layer of the material (for example, a thickness of several tens to several hundreds of µm) by a heat source (for example, laser light or electron beam) is often adopted.

The powder bed fusion bonding method is a method in which after forming a powder bed with a powder layer in a size including a cross-section of an outer shape of an object to be manufactured (hereinafter, referred to as a manufacturing designed object), the powder bed in a region corresponding to a solid part of the manufacturing designed object is melted and bonded with a heat source, and is a technology of manufacturing while repeating powder bed formation, melting and bonding for each layer. In addition, the directional energy deposition method is a technology of manufacturing by melting and bonding for each layer with a heat source while supplying a powder to a region corresponding to a solid part of a manufacturing designed object.

In order to perform the additive manufacturing described above, generally, a two-dimensional shape data group on slices perpendicular to a stacking direction is created from three-dimensional shape data such as CAD data of a manufacturing designed object, and the two-dimensional data group is input as input data to an additive manufacturing device.

Here, in both the powder bed fusion bonding method and the directional energy deposition method, a first layer of additive manufacturing is formed on a plate material (referred to as a base plate) having sufficient rigidity. In other words, the first layer is formed on a stable support body.

On the other hand, in additive manufacturing of a second and subsequent layers, when a shape of a manufacturing designed object has a portion (hereinafter, referred to as an overhanging portion) protruding from a lower layer, powder for the overhanging portion melts and bonds on a powder bed that is not melted and bonded (in a case of a powder bed fusion bonding method) or in a partial mid-air state (in a case of a directional energy deposition method), and deformation due to own weight or thermal contraction is likely to occur due to weak support from below. Further, when the deformation due to own weight or thermal contraction occurs, a shape of an object that is manufactured (hereinafter, referred to as a manufactured object) largely deviates from a shape of a manufacturing designed object, or a manufactured object may incline unexpectedly and comes into contact with a tool in the additive manufacturing device during manufacturing, resulting in a failure in manufacturing.

In order to avoid such a manufacturing failure, a support reinforcing portion called a support may be provided as a part of the shape of the manufacturing designed object on a lower layer of the overhanging portion. In this case, a two-dimensional shape data group of a model (hereinafter, referred to as a manufacturing model) in which a support is provided to the manufacturing designed object in advance is created as input data, and is input to the additive manufacturing device. The provided support may be removed by machining or the like after the manufactured object is manufactured.

As a matter of course, if the deformation due to own weight or thermal contraction is within an allowable range in a process of manufacturing the manufactured object, it is not necessary to provide a support for the purpose of preventing the deformation (that is, it is not necessary to create the manufacturing model and the input data of the manufacturing model).

For example, Patent Literature 1 discloses a method of designing and providing a support (support body) for preventing deformation of a manufactured object during forming. Specifically, Patent Literature 1 discloses an information processing method for generating slice data in a manufacturing device configured to manufacture a three-dimensional object including a manufacturing object by sequentially stacking manufacturing materials based on the slice data generated for each layer, the information processing method including: a step of acquiring cross-sectional data on a cross-section corresponding to a target layer of the manufacturing object so as to generate the slice data of the target layer; a step of judging the presence and absence of a support required region, which requires a support body that supports the manufacturing object, in the target layer, based on the cross-sectional data and a shape of the manufacturing object located above the target layer; a step of determining, when the support required region is present in the target layer, a type of the support body to be disposed in the support required region according to a load correspondence value which indicates the magnitude of a load applied from the top; and a step of generating, as the slice data of the target layer, image data including a structure region indicating the cross-section of the manufacturing object in the target layer and a support region indicating the cross-section of the support body, based on the cross-sectional data and the determined type of the support body.

PRIOR ART LITERATURE

Patent Literature

PTL 1: JP-A-2016-107638

SUMMARY OF INVENTION

Technical Problem

According to Patent Literature 1, it is said that material consumption of a support body can be prevented while preventing a manufactured object from being deformed during forming. In particular, since the technology in Patent Literature 1 is directed to additive manufacturing (that is, additive manufacturing of a resin material) by a sheet stacking method, it is considered relatively easy to form a manufactured object and a support with different materials. As a result, it is considered that there is an advantage that the support can be selectively removed alone by a method such as dissolving the support with a dedicated solvent.

However, in a case of powder additive manufacturing of a metal material, since it is difficult to form a manufactured object and a support with different materials, the manufactured object and the support are generally formed of the same material, and the support is usually removed by machining such as cutting. Therefore, in the powder additive manufacturing of a metal material, the cost for removing the support is easily increased compared with the additive manufacturing of a resin material, and it is required to provide a support that is easy to remove from the viewpoint of cost reduction.

However, when a provided form of the support is too small in consideration of ease of removal, possibility of deformation of the support and the manufacturing object increases due to stress caused by volume contraction when a metal powder is melted and bonded (volume contraction due to reduction of voids between powder particles and thermal contraction due to temperature change). Accordingly, it is important to design and provide a support that can withstand the stress. In particular, in a case of a program in which a plurality of manufactured objects is formed at the same time in one additive manufacturing device from the viewpoint of reducing a manufacturing cost, when a manufacturing failure occurs in one of the plurality of manufactured objects, other manufactured objects having no problem need to be manufactured again, thereby causing a loss of time and cost.

Accordingly, an object of the invention is to provide an input data creation device for powder additive manufacturing that can design and provide an appropriate support that avoids a manufacturing failure and considers ease of removal in powder additive manufacturing.

Solution to Problem

One aspect of the invention provides an input data creation device for powder additive manufacturing that creates input data of a model in which a support is provided to a manufacturing designed object in powder additive manufacturing, the input data creation device for powder additive manufacturing including: a mechanical quantity calculation unit including a mechanism configured to calculate a mechanical quantity generated on a surface to which the support is provided in the manufacturing designed object; and a support shape determination unit including a mechanism configured to determine, based on information on a plurality of types of support shapes, information on an allowable mechanical quantity defined for each support shape, and a mechanical quantity calculated by the mechanical quantity calculation unit, an optimized support shape having an allowable mechanical quantity equal to or greater than the calculated mechanical quantity from among the plurality of types of support shapes.

The mechanical quantity in the invention is a general term for a force or a stress generated on a surface to which the support is provided and on the support itself, and may be a force or a stress as long as the mechanical quantity is converted so that a mechanical quantity unit (for example, N and MPa) is unified in each processing (each calculation) in the invention.

According to the invention, the following improvements and changes can be added in the input data creation device for powder additive manufacturing.

(i) The support shape determination unit includes a mechanism configured to, when there are a plurality of support shapes whose allowable mechanical quantities are equal to or greater than the calculated mechanical quantity, refer to information on a support removal man-hour defined for each support shape to make a minimum support removal man-hour as a condition for determining the optimized support shape.

(ii) The support shape determination unit includes a mechanism configured to, when there are a plurality of support shapes whose allowable mechanical quantities are equal to or greater than the calculated mechanical quantity, make a minimum allowable mechanical quantity as a condition for determining the optimized support shape.

(iii) The input data creation device for powder additive manufacturing further includes a display unit configured to display input information and calculation result information, and the support shape determination unit includes a mechanism configured to, when the optimized support shape whose allowable mechanical quantity is equal to or greater than the calculated mechanical quantity does not exist, display the fact on the display unit.

(iv) The input data creation device for powder additive manufacturing further includes a patterning support allowable mechanical quantity input unit configured to input relationship information between the plurality of types of support shapes and the allowable mechanical quantity for each support shape; and a patterning support removal man-hour input unit configured to input relationship information between the plurality of types of support shapes and the removal man-hour for each support shape. The support shape determination unit includes a mechanism configured to determine the optimized support shape based on information input to the patterning support allowable mechanical quantity input unit and the patterning support removal man-hour input unit.

(v) The input data creation device for powder additive manufacturing further includes a patterning support allowable mechanical quantity database that stores relationship information between the plurality of types of support shapes and the allowable mechanical quantity for each support shape in advance; and a patterning support removal man-hour database that stores relationship information between the plurality of types of support shapes and the removal man-hour for each support shape in advance. The support shape determination unit includes a mechanism configured to determine the optimized support shape based on information stored in the patterning support allowable mechanical quantity database and the patterning support removal man-hour database.

Advantageous Effect

According to the invention, there is provided an input data creation device for powder additive manufacturing that can design and provide an appropriate support that avoids a manufacturing failure and considers ease of removal in powder additive manufacturing. Further, by using the input data creation device for powder additive manufacturing according to the invention, efficiency of powder additive manufacturing can be improved.

DESCRIPTION OF EMBODIMENTS

Figure 1:
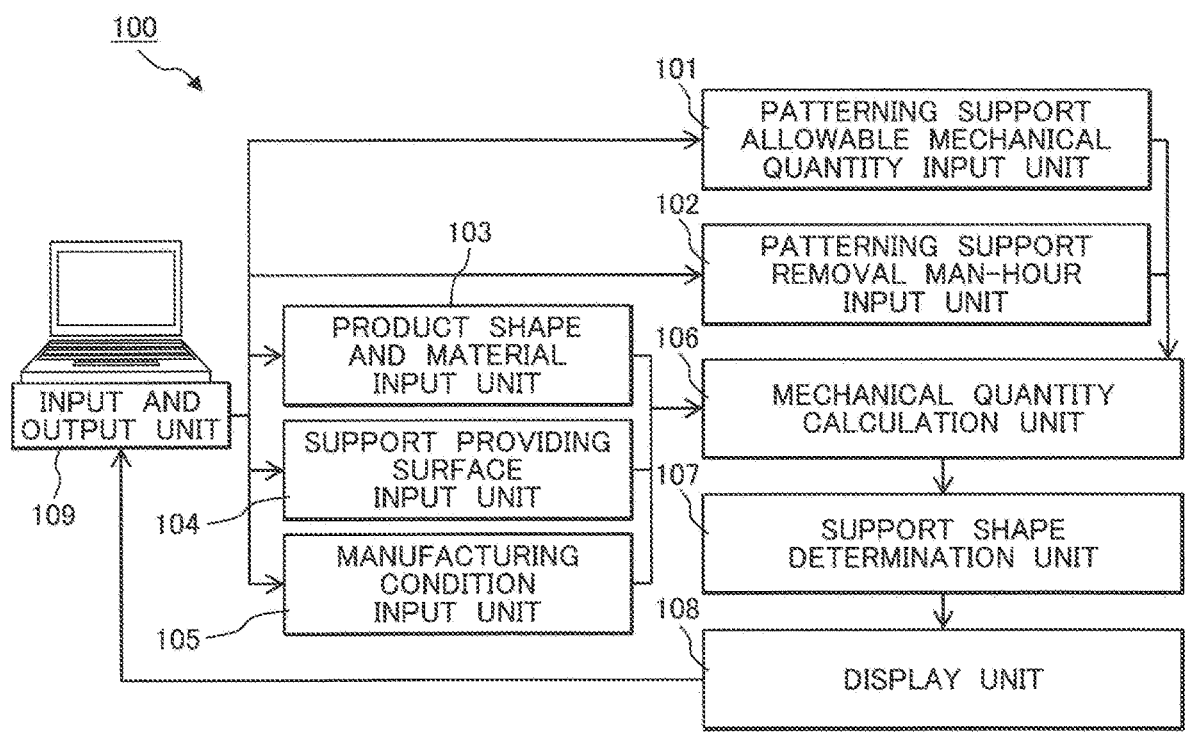
FIG. 1 is a schematic diagram showing a schematic configuration of an input data creation device for powder additive manufacturing according to a first embodiment.

Hereinafter, embodiments of an input data creation device for powder additive manufacturing according to the invention will be described in detail with reference to the drawings. However, the invention is not limited to the embodiments described here, and can be appropriately combined with known technique or may be modified based on known technique without departing from the technical idea of the invention. The same members and portions are denoted by the same reference numerals, and a repetitive description thereof will be omitted.

First Embodiment

As described above, in additive manufacturing of a metal material, a method of manufacturing (for example, a powder bed fusion bonding method or a directional energy deposition method) by melting and bonding a powder layer of the material (for example, a thickness of several tens to several hundreds of μm) with a heat source (for example, laser light or electron beam) is often adopted. In the present embodiment, the powder bed fusion bonding method will be described as an example with reference to FIGS. 1 to 11.

Figure 2:
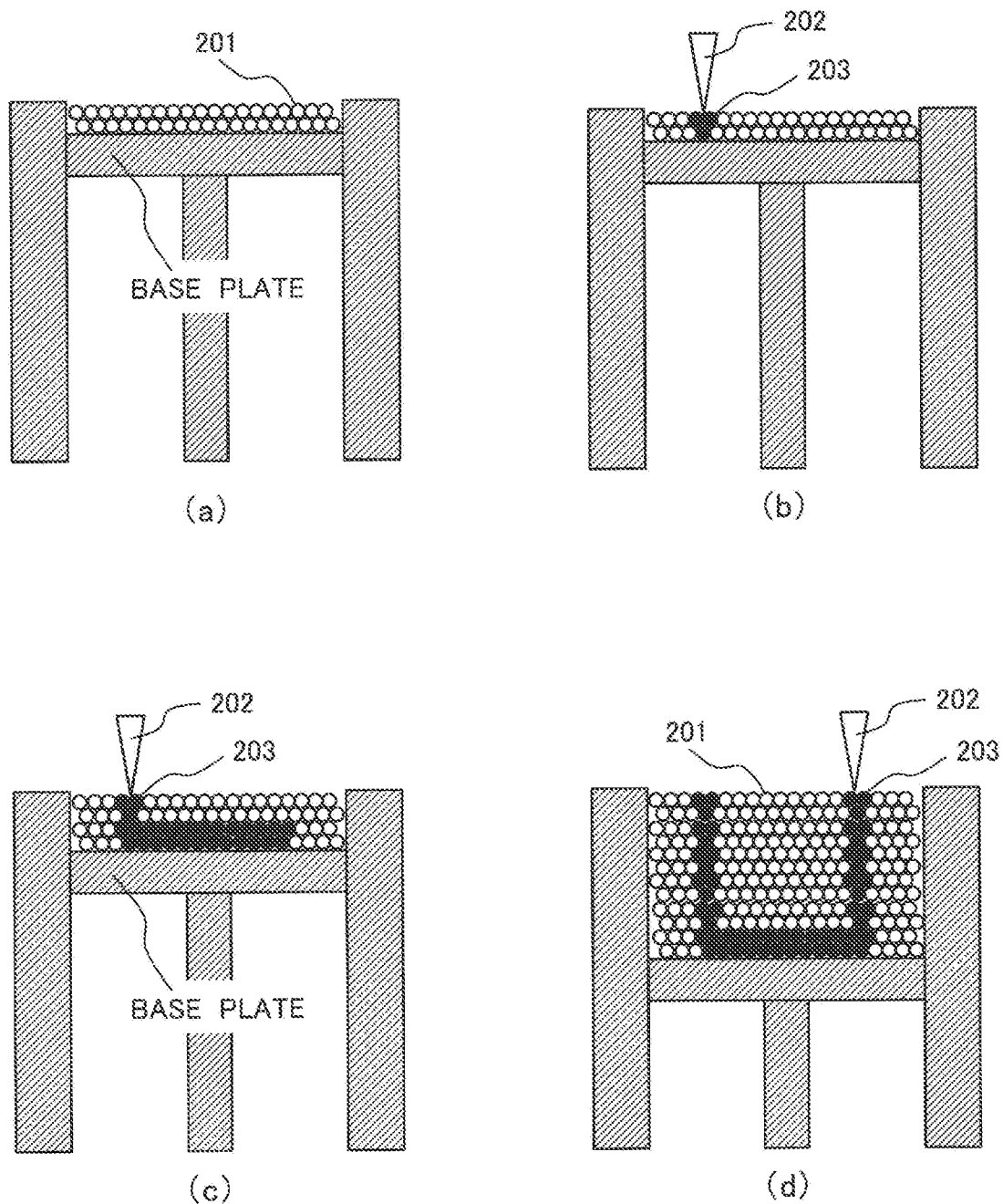
FIG. 2 is a schematic cross-sectional view showing an example of a powder additive manufacturing process by a powder bed fusion bonding method.

FIG. 2 is a schematic sectional view showing an example of a powder additive manufacturing process by the powder bed fusion bonding method. As shown in FIG. 2, first, powders 201 are spread over a base plate to prepare a powder bed for one layer (see FIG. 2 (a)). Next, a region corresponding to a solid part of a manufacturing designed object is irradiated with laser beam 202 to melt and bond powders 203 in the region (see FIG. 2(b)). The powder 201 indicated by a white circle means a powder that is not melted and bonded, and the powder 203 indicated by a black circle means a powder that is melted and bonded.

Next, the base plate is lowered by a thickness (height) of one layer of the powder bed, a powder bed of one layer is newly prepared, and then the region corresponding to the solid part of the manufacturing designed object is irradiated with the laser beam 202 to melt and bond the powders 203 in the region (see FIG. 2(c)). Thereafter, by repeating a process in FIG. 2(c), a manufactured object is formed (see FIG. 2(d)). After the manufactured object buried in the powder bed is taken out, powders (powders 201) adhering to the manufactured object can be removed by a treatment such as blowing off with a gas.

In the powder bed fusion bonding method, a region to be melted and bonded in a second and subsequent powder beds is basically directly above a region (including positions shifted in a horizontal direction within an allowable range) that is melted and bonded in a previous layer. However, when a shape of the manufacturing designed object has an overhanging portion, it is necessary to melt and bond a next layer on the powder bed that is not melted and bonded (at a position clearly deviated from the region that is melted and bonded in the previous layer). In such a case, a support that supports the overhanging portion from below is formed in advance so as to keep the above-described basics.

In other words, when deviating from the above-described basics, deformation due to own weight, thermal contraction or the like is likely to occur, and the manufactured object may deviate from an intended shape (that is, a shape of the manufacturing designed object), or the manufactured object may incline unexpectedly and comes into contact with a tool in an additive manufacturing device during manufacturing. Accordingly, possibility of a manufacturing failure increases. In particular, in a case of a program in which a plurality of manufactured objects is manufactured at the same time in one additive manufacturing device from the viewpoint of reducing a manufacturing cost, when a manufacturing failure occurs in one of the plurality of manufactured objects, other manufactured objects having no problem need to be manufactured again, resulting in a loss of time and cost. For this reason, a technical significance of the input data creation device for powder additive manufacturing that can design and provide appropriate support that avoids a manufacturing failure is high.

Hereinafter, the configuration of the input data creation device for powder additive manufacturing according to the present embodiment will be described.

FIG. 1 is a schematic diagram showing a schematic configuration of the input data creation device for powder additive manufacturing according to a first embodiment. As shown in FIG. 1, an input data creation device 100 for powder additive manufacturing according to the first embodiment includes an input and output unit 109, a patterning support allowable mechanical quantity input unit 101, a patterning support removal man-hour input unit 102, a product shape and material input unit 103, a support providing surface input unit 104, a manufacturing condition input unit 105, a mechanical quantity calculation unit 106, a support shape determination unit 107, and a display unit 108.

More specifically, the input and output unit 109 is a mechanism that inputs various conditions for powder additive manufacturing, and outputs a calculation result that is based on the input. The patterning support allowable mechanical quantity input unit 101 is a mechanism that inputs relationship information between a plurality of types of patterning support shapes prepared in advance and an allowable mechanical quantity determined for each support shape.

The allowable mechanical quantity determined for each support shape means, for example, a smaller mechanical quantity of a mechanical quantity at which a support is plastically deformed more than allowable and a mechanical quantity at which a support breaks (mechanical quantity at which a support is separated from the manufactured object).

The patterning support removal man-hour input unit 102 is a mechanism that inputs relationship information between a patterning support shape and a removal man-hour of the support. The product shape and material input unit 103 is a mechanism that inputs product shape and material information. The support providing surface input unit 104 is a mechanism that inputs information on a surface to which a support can be provided in the product shape. The manufacturing condition input unit 105 is a mechanism that inputs information on a condition at the time of additive manufacturing (for example, a laser scanning speed). It is preferable that an input result is displayed on the display unit 108 in order to confirm various inputs.

The mechanical quantity calculation unit 106 is a mechanism that obtains a mechanical quantity generated on the support providing surface based on the information input by each of the input units 101 to 105. The support shape determination unit 107 is a mechanism that obtains a support whose removal man-hour without causing plastic deformation or breakage of the support itself is the minimum based on the mechanical quantity of the support providing surface obtained by the mechanical quantity calculation unit 106.

In determining the support shape, the removal man-hour may be minimized by limiting a maximum deformation quantity of the support or a maximum mechanical quantity at which the support does not plastically deform, and the deformation quantity of the support or the mechanical quantity applied to the support may be minimized by limiting the maximum removal man-hour. The presence or absence of plastic deformation of the support is determined by, for example, setting the mechanical quantity calculated by the mechanical quantity calculation unit 106 as a boundary condition of a manufacturing object connection surface of the support (that is, a support providing surface), and using a method such as finite element analysis. It is determined that the plastic deformation occurs when "the maximum value of equivalent mechanical quantity in the support (for example, Mises stress)≥a value of a plastic deformation mechanical quantity of the support (for example, yield stress or 0.2% proof stress)" is true, and it is determined that the plastic deformation does not occur when "a maximum value of equivalent mechanical quantity in the support (for example, Mises stress)≥a value of a plastic deformation mechanical quantity of the support (for example, yield stress or 0.2% proof stress)" is false. A value of the yield stress or the 0.2% proof stress may be a characteristic value measured by using a test sample separately prepared by an additive manufacturing device to be used, or may be a mechanical characteristic value described in literature or the like.

Thereafter, the support shape determined by the support shape determination unit 107 and the mechanical quantity applied to the support which is calculated by the mechanical quantity calculation unit 106 are displayed on the display unit 108. Based on a result in the display unit 108, shape data of the support is converted into a data format (for example, an STL format) corresponding to the additive manufacturing device to be used, and the shape data is output to the additive manufacturing device via the input and output unit 109. Accordingly, the manufactured object can be formed.

As data to be output to the additive manufacturing device, both the shape data of the support and the allowable mechanical quantity data may be output, or a method of outputting only the allowable mechanical quantity data to the additive manufacturing device instead of the shape data may be used so as to reduce the data capacity. When the mechanical quantity calculated by the mechanical quantity calculation unit 106 exceeds an allowable value of the support (for example, when the support is predicted to be plastically deformed), it is preferable to perform emphasis such as highlight in the display unit 108 and stop the output to the additive manufacturing device.

Figure 3:
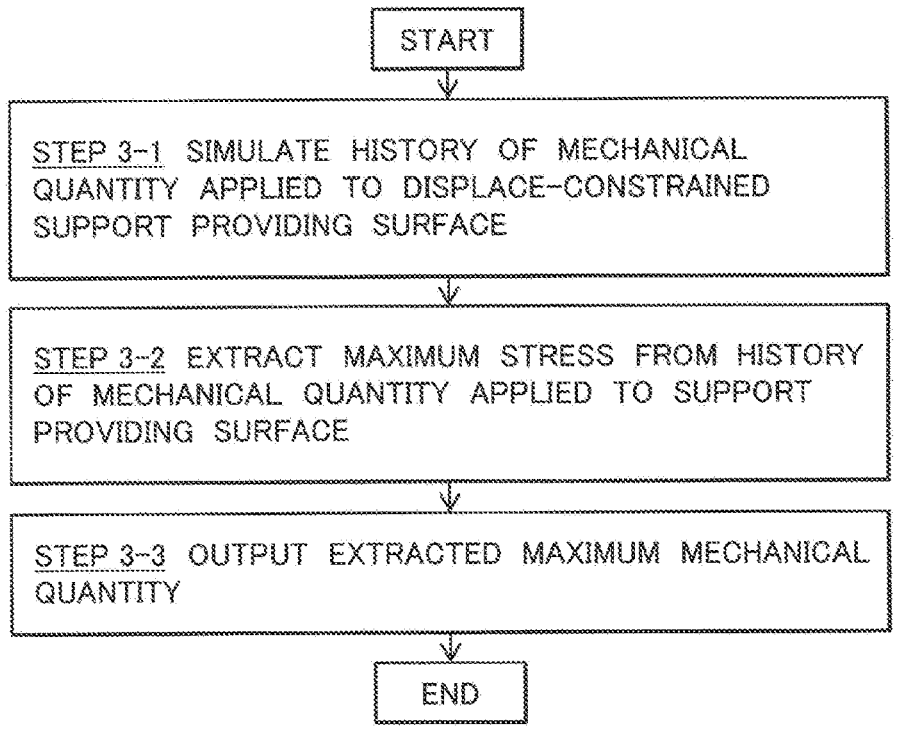
FIG. 3 is a flow showing processing executed by a mechanical quantity calculation unit.

Next, a processing flow executed by the mechanical quantity calculation unit 106 will be described. FIG. 3 is a flow showing processing executed by the mechanical quantity calculation unit. As shown in FIG. 3, the mechanical quantity calculation unit 106 executes the following processing of STEPS 3-1 to 3-3.

<Step 3-1>

Based on the product shape and material data input to the product shape and material input unit 103, the support providing surface data input to the support providing surface input unit 104, and the manufacturing condition data input to the manufacturing condition input unit 105, a history of the mechanical quantity applied to a displace-constrained support providing surface is simulated in a manufacturing process.

<Step 3-2>

The maximum mechanical quantity is extracted from the history of the mechanical quantity applied to the support providing surface obtained in STEP 3-1. When there is a plurality of support providing surfaces, the maximum mechanical quantity for each providing surface is extracted, separately.

<Step 3-3>

The extracted maximum mechanical quantity is output.

Figure 4:
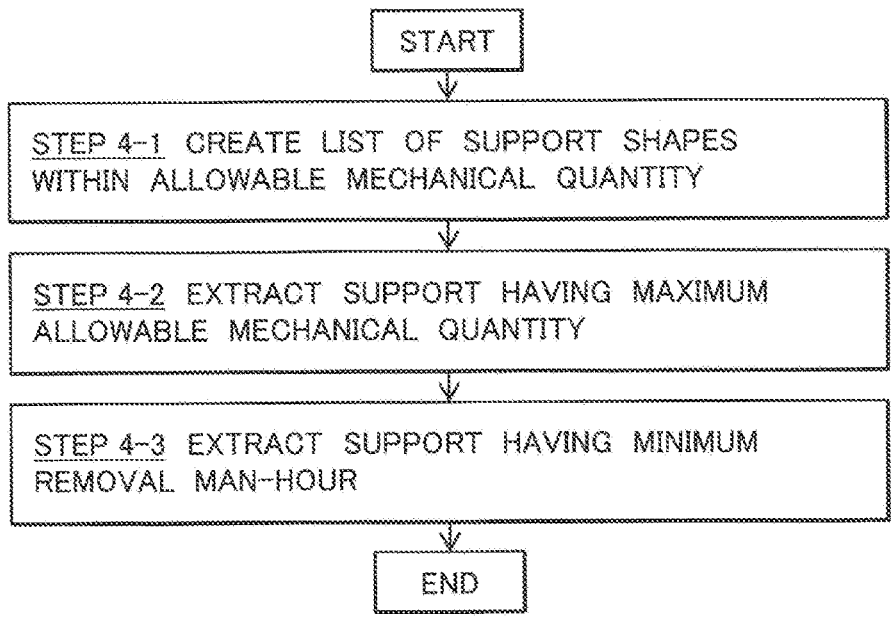
FIG. 4 is a flow showing processing executed by a support shape determination unit.

Next, a processing flow executed by the support shape determination unit 107 will be described. FIG. 4 is a flow showing processing executed by the support shape determination unit. As shown in FIG. 4, the support shape determination unit 107 executes the following processing of STEPS 4-1 to 4-3.

<Step 4-1>

On a condition that the allowable mechanical quantity defined for each support shape input by the patterning support allowable mechanical quantity input unit 101 is equal to or greater than the mechanical quantity calculated by the mechanical quantity calculation unit 106, all support shapes applicable to the manufacturing designed object are extracted from the plurality of types of support shapes, and a list of support shapes within allowable mechanical quantity is created.

<Step 4-2>

A support shape having the maximum allowable mechanical quantity is extracted from the created list of support shapes within allowable mechanical quantity. When a support shape whose allowable mechanical quantity defined for each support shape is equal to or greater than the mechanical quantity calculated by the mechanical quantity calculation unit 106 cannot be extracted, the design of the manufacturing designed object itself is determined to be an error, and the fact thereof is displayed on the display unit 108.

<Step 4-3>

When there is a plurality of support shapes extracted in STEP 4-2, a support shape having the minimum removal man-hour is extracted from the plurality of support shapes.

Figure 5:
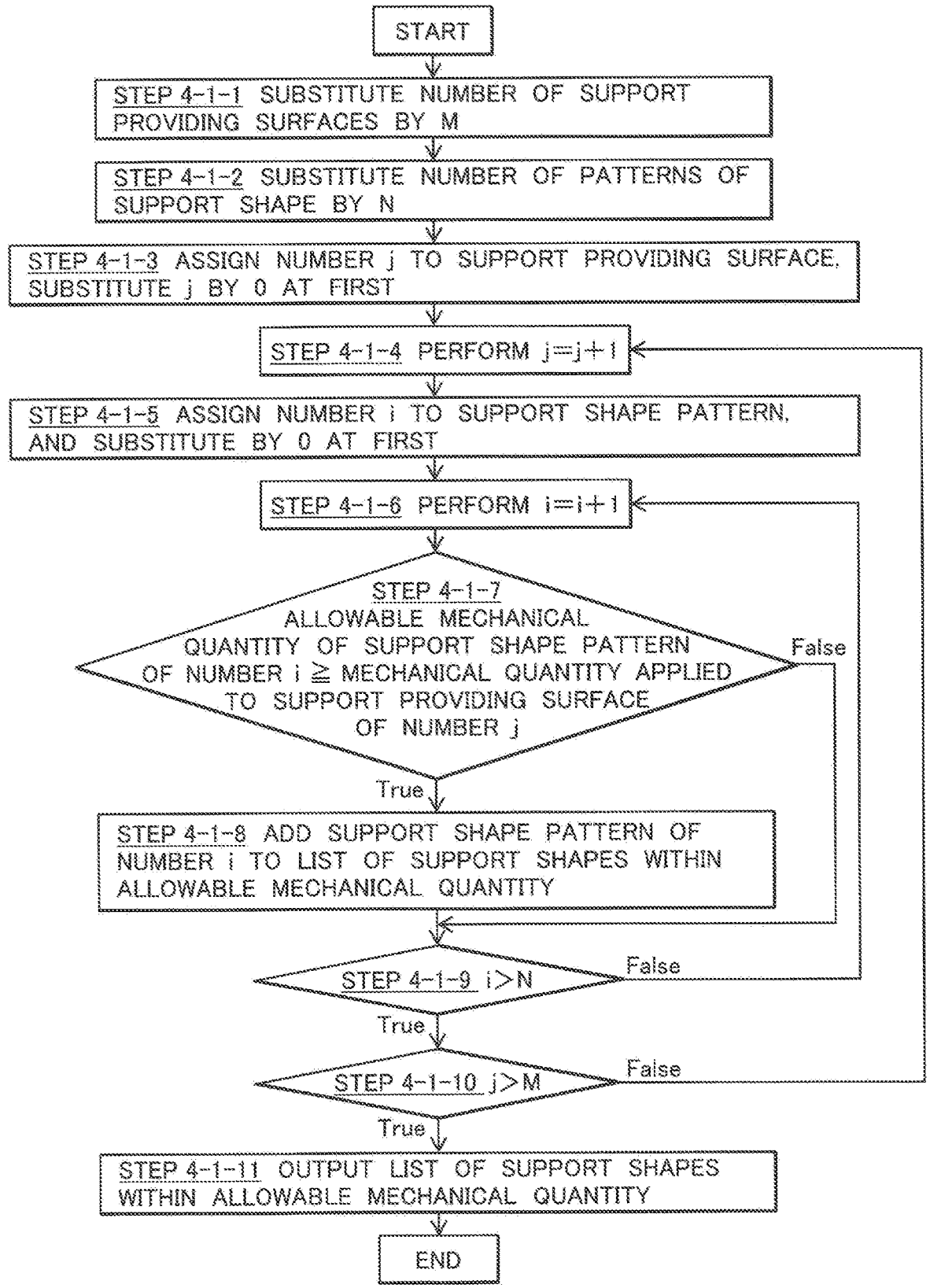
FIG. 5 is a flow showing detailed processing in STEP 4-1.

Next, an example of a more detailed processing flow of STEP 4-1 described above will be described with reference to FIG. 5. FIG. 5 is a flow showing the detailed processing in STEP 4-1. As shown in FIG. 5, in STEP 4-1, the following STEPS 4-1-1 to 4-1-11 are executed.

<Step 4-1-1>

The number of support providing surfaces input by the support providing surface input unit 104 is substituted by M.

<Step 4-1-2>

The number of patterns of the support shape input by the patterning support allowable mechanical quantity input unit 101 is substituted by N.

<Step 4-1-3>

Number j is assigned to the support providing surfaces, and j is substituted by 0 at first.

<Step 4-1-4>"j=j+1" is performed, and j after addition is changed by 1 in a range of 1 to M.

<Step 4-1-5>

Number i is assigned to support shape patterns, and i is substituted by 0 at first.

<Step 4-1-6>"i=i+1" is performed, and i after addition is changed by 1 in a range of 1 to N.

<Step 4-1-7>

When "an allowable mechanical quantity of a support shape pattern of the number i≥a mechanical quantity applied to a support providing surface of number j" is true, the processing proceeds to STEP 4-1-8. Otherwise, the processing proceeds to STEP 4-1-9.

<Step 4-1-8>

The support shape pattern of the number i is added to the list of support shapes within allowable mechanical quantity.

<Step 4-1-9>

When "i>N" is true, the processing proceeds to STEP 4-1-10. Otherwise, the processing returns to STEP 4-1-6.

<Step 4-1-10>

When "j>M" is true, the processing proceeds to STEP 4-1-11. Otherwise, the processing returns to STEP 4-1-4.

<Step 4-1-11>

The list of support shapes within allowable mechanical quantity that allows the mechanical quantity applied to the support providing surface is output.

The allowable mechanical quantity of the support shape pattern may be a function of the mechanical quantity applied to the support providing surface. In this case, a parameter of the support shape can be determined by the mechanical quantity applied to the support providing surface.

Further, by performing the structural analysis using the mechanical quantity as the boundary condition, it may be determined whether a plastic deforming place occurs in the support. If the plastic deformation does not occur, it may be determined that the mechanical quantity is allowable. As described above, the presence or absence of plastic deformation of the support is determined by, setting the mechanical quantity calculated by the mechanical quantity calculation unit 106 as a boundary condition of the support providing surface, and using a method such as finite element analysis. It is determined that the plastic deformation occurs when "the maximum value of equivalent mechanical quantity in the support (for example, Mises stress) a value of a plastic deformation stress of the support" is true, and it is determined that the plastic deformation does not occur when "a maximum value of equivalent mechanical quantity in the support (for example, Mises stress) a value of a plastic deformation stress of the support" is false.

As for the removal man-hour of the support shape pattern, for example, it is preferable that the removal man-hour is reduced as a cross-sectional area per cylindrical support is small, and the removal man-hour is increased as the cross-sectional area is large.

Next, examples of various input screens in the input data creation device for powder additive manufacturing according to the invention will be described. It is preferable that the input data creation device 100 for powder additive manufacturing receives various inputs from a user via the input and output unit 109, and displays input content on the display unit 108. Although a format for receiving input of necessary information from the user is described here, the necessary information may be stored in advance in a storage unit (not shown) of the input data creation device 100 for powder additive manufacturing.

Figure 6:
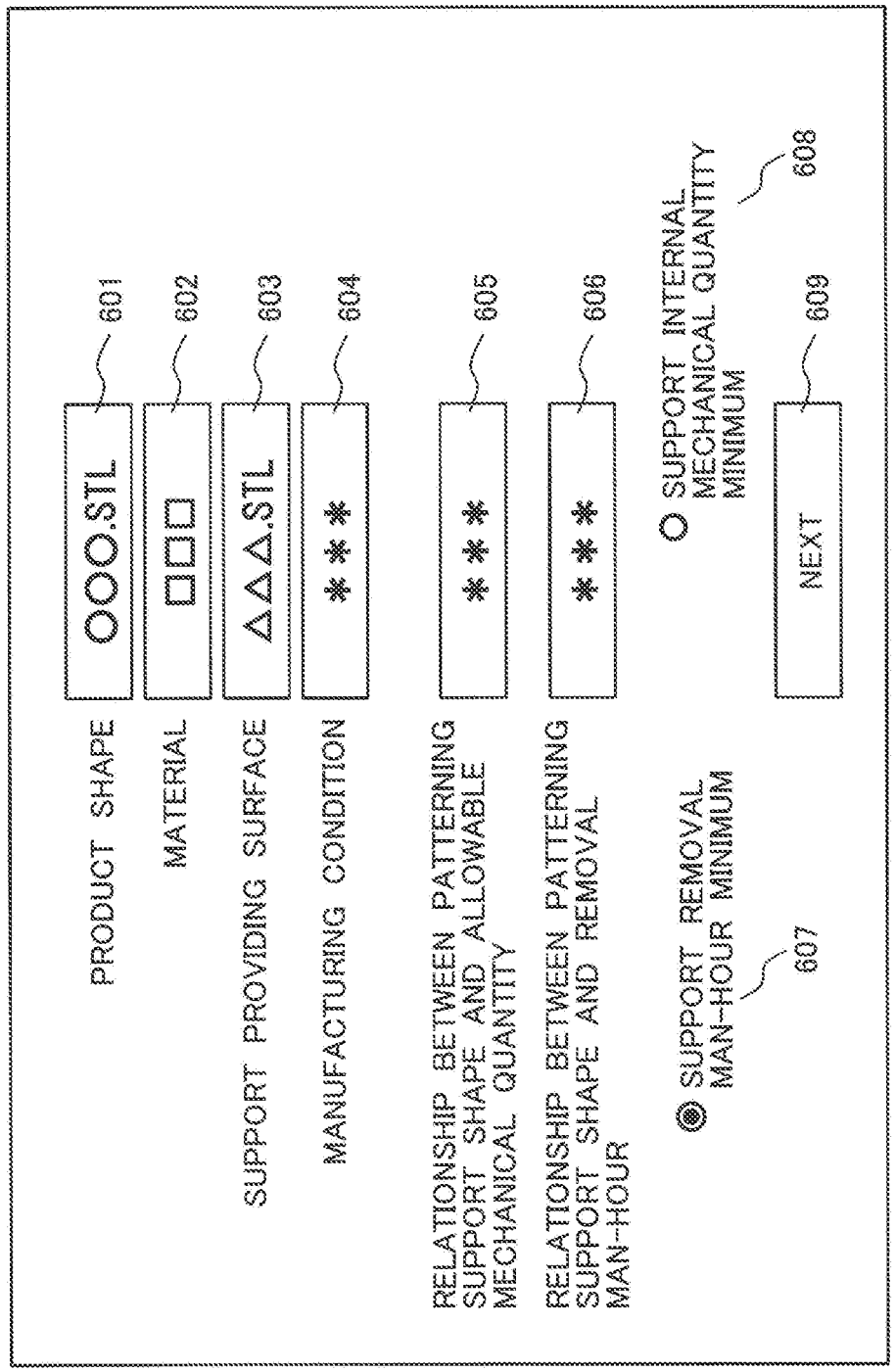
FIG. 6 is a diagram showing an example of an input screen of the input data creation device for powder additive manufacturing according to the invention.

FIG. 6 is a diagram showing an example of an input screen (an example of a display in the display unit) of the input data creation device for powder additive manufacturing according to the invention. As shown in FIG. 6, the input screen includes, for example, a product shape display 601, a material display 602, a support providing surface display 603, a manufacturing condition display 604, a relationship display 605 between a patterning support shape and an allowable mechanical quantity, and a relationship display 606 between a patterning support shape and a removal man-hour. A support removal man-hour minimum selection display 607 and a support internal mechanical quantity minimum selection display 608 are provided. The support removal man-hour minimum selection display 607 and the support internal mechanical quantity minimum selection display 608 may be configured to display both as shown in FIG. 6, or may be configured to display only one of the support removal man-hour minimum selection display 607 and the support internal mechanical quantity minimum selection display 608.

The manufacturing condition display 604 includes a condition such as a laser scanning speed. Further, in the manufacturing condition display 604, a powder additive manufacturing device may be selected by associating a manufacturing condition with the powder additive manufacturing device matching the manufacturing condition.

The support providing surface display 603 may be a method of inputting, as a threshold value, an angle (an angle formed between a stacked surface and an outer shape surface of the manufacturing designed object) of the outer shape surface of the manufacturing designed object with respect to a stacking direction, and determining and displaying the support providing surface by calculation.

In an example in FIG. 6, after selecting the support removal man-hour minimum selection display 607 or the support internal mechanical quantity minimum selection display 608, a next screen is moved by pressing a next display 609. For example, when the support removal man-hour minimum selection display 607 is selected, the next screen moves to a screen shown in FIG. 7, and when the support internal mechanical quantity minimum selection display 608 is selected, the next screen moves to a screen shown in FIG. 8.

Figure 7:
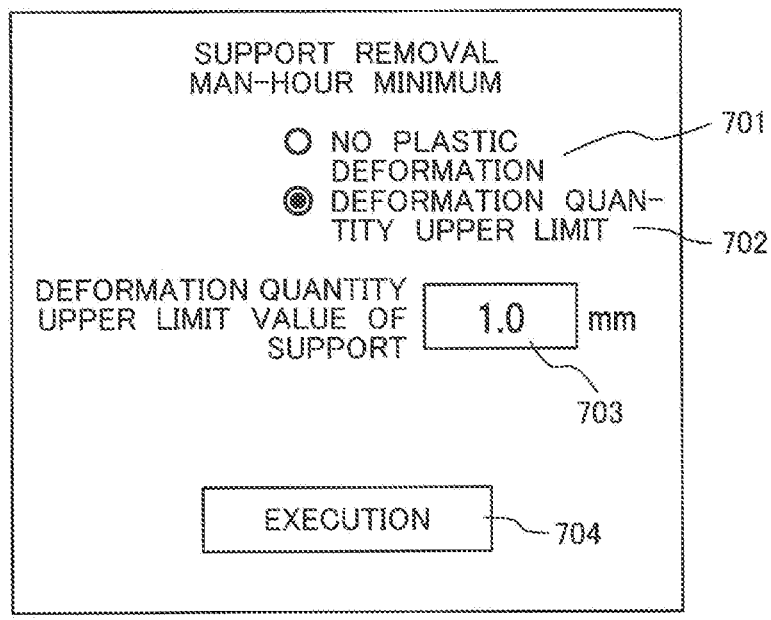
FIG. 7 is a diagram showing an example of a screen displayed when a "support removal man-hour minimum selection display" is selected.

FIG. 7 is a diagram showing an example of a screen displayed when the "support removal man-hour minimum selection display" is selected. As shown in FIG. 7, a no plastic deformation display 701 or a deformation quantity upper limit display 702 can be selected. When the deformation quantity upper limit display 702 is selected, a numerical value is input to a deformation quantity upper limit value display 703. As a matter of course, an upper limit value is set to a value larger than 0. When the input is completed, an execution display 704 is pressed.

Figure 8:
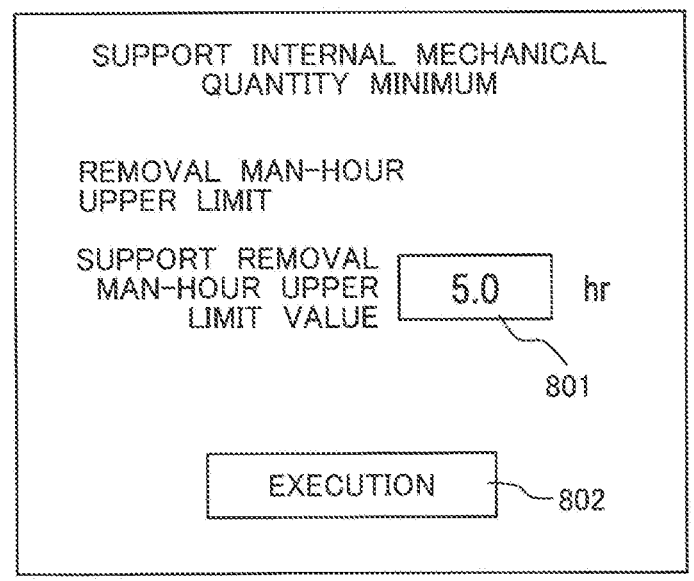
FIG. 8 is a diagram showing an example of a screen displayed when a "support internal mechanical quantity minimum selection display" is selected.

FIG. 8 is a diagram showing an example of a screen displayed when the "support internal mechanical quantity selection display" is selected. As shown in FIG. 8, a numerical value is input to a support removal man-hour upper limit value display 801. As a matter of course, an upper limit value is set to a value larger than 0. When the input is completed, an execution display 802 is pressed.

Next, a screen in the display unit 108 after the execution display 704 or the execution display 802 is pressed will be described.

Figure 9:
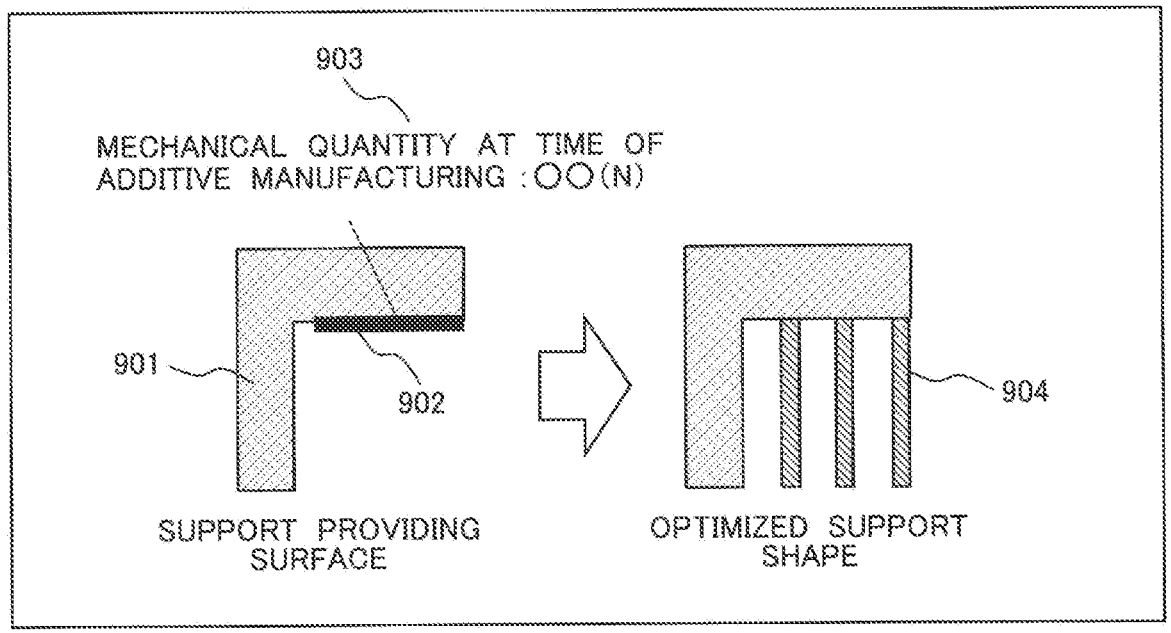
FIG. 9 is a diagram showing an example of a screen on which calculation results in the mechanical quantity calculation unit and a support determination unit are displayed.

FIG. 9 is a diagram showing an example of a screen on which calculation results in the mechanical quantity calculation unit and the support determination unit are displayed. As shown in FIG. 9, a product shape display 901, a support providing surface display 902, and a mechanical quantity calculation result 903 are displayed. In addition, an optimized support shape 904 determined by the support shape determination unit 107 is displayed. When a support shape within allowable mechanical quantity cannot be determined, it is preferable to emphasize a position of the support providing surface as described above.

Further, by pressing in accordance with the optimized support shape 904 in the screen in FIG. 9, data of the optimized support shape 904 and data of the support shape that is not selected by the support shape determination unit 107 in the list of support shapes within allowable mechanical quantity may be displayed.

Figure 10:
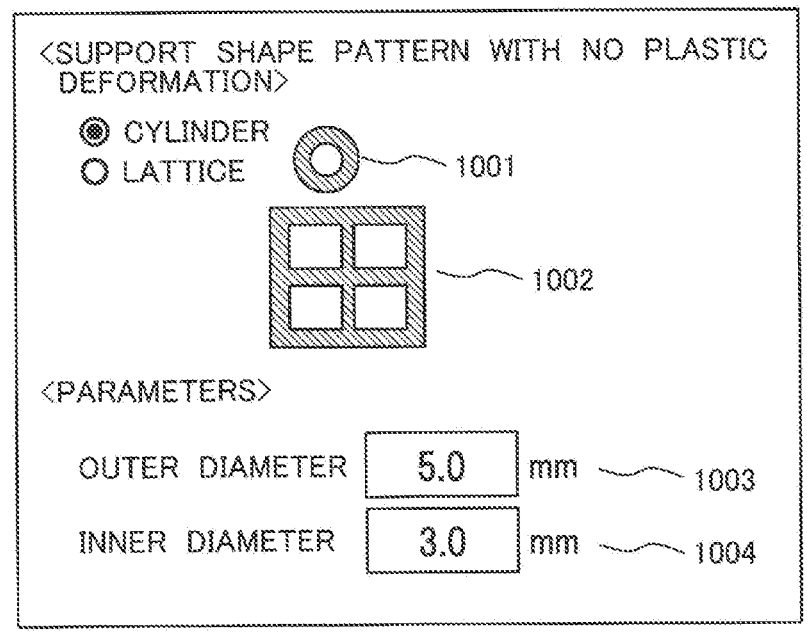
FIG. 10 is a diagram showing an example of a screen that displays optimized support shape data and support shape data that is not selected by the support shape determination unit in a list of support shapes within allowable mechanical quantity.

FIG. 10 is a diagram showing an example of a screen that displays the data of the optimized support shape and the data of the support shape that is not selected by the support shape determination unit in the list of support shapes within allowable mechanical quantity. FIG. 10 shows, for example, a cylindrical support shape display 1001 and a lattice support shape display 1002, which can be selected and changed by a user. Further, when there are parameters that can be adjusted in the selected support shape pattern (outer diameter parameter display 1003 and inner diameter parameter display 1004 in the figure), it is preferable that the parameters are displayed together and numerical values of the parameters can be changed by the user. When the numerical value of the parameter is changed to deviate from the allowable mechanical quantity, it is preferable to display the fact.

Figure 11:
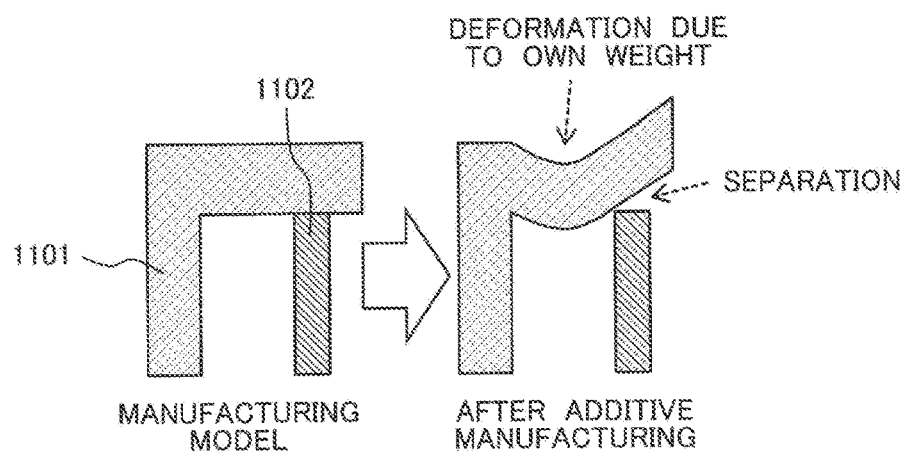
FIG. 11 is a schematic cross-sectional view showing an example of a manufacturing failure that may occur when an appropriate support is not designed and provided.

Effect of the present embodiment will be briefly described. FIG. 11 is a schematic cross-sectional view showing an example of a manufacturing failure that may occur when an appropriate support is not designed and provided. As shown in FIG. 11, when powder additive manufacturing is performed based on a manufacturing model in which an inappropriate support 1102 is provided to a product 1101 having a desired shape, deformation due to own weight of the manufacturing object may occur in a region not supported by the support, or deformation due to volume contraction of the manufacturing object caused by insufficient mechanical strength of the support (here, separation of the manufacturing object and the support, warping of the manufacturing object) may occur.

On the other hand, in the present embodiment, since the mechanical strength of the support required to maintain the shape of the manufacturing designed object is obtained by simulation, a support having an appropriate mechanical strength (optimized support shape 904) can be provided. As a result, the manufactured object having a desired shape can be efficiently manufactured at low cost (that is, the efficiency of powder additive manufacturing can be improved).

Second Embodiment

Figure 12:
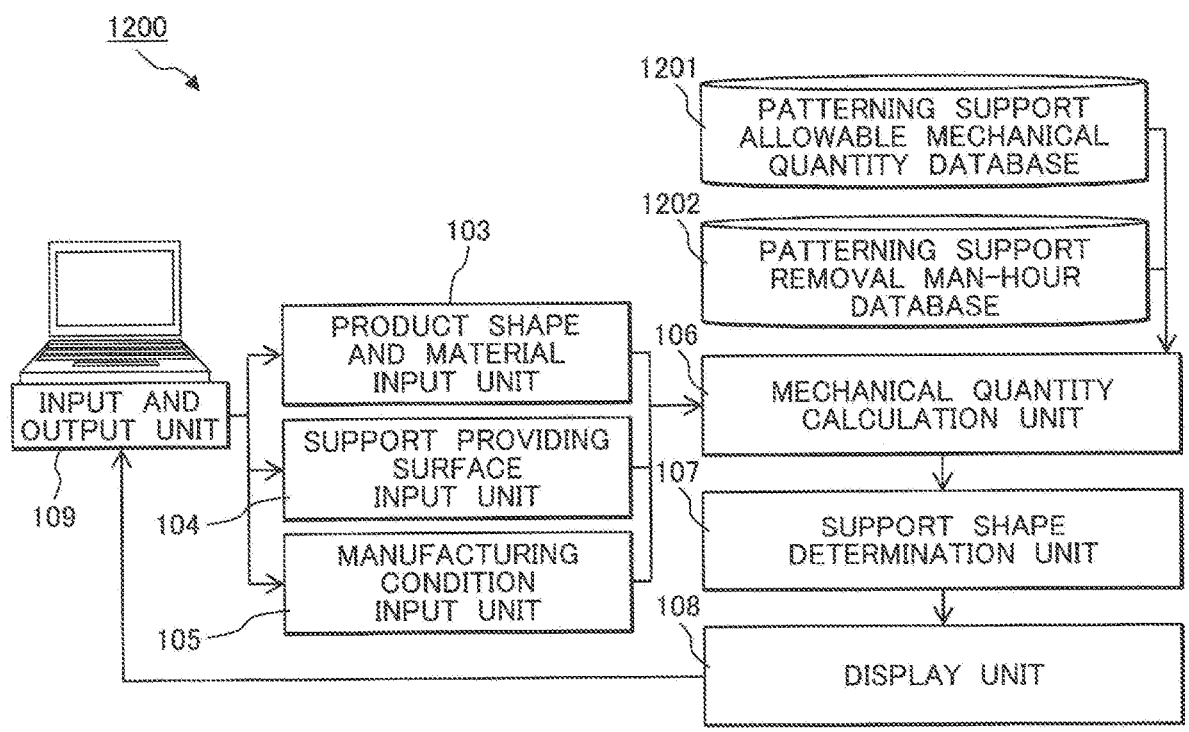
FIG. 12 is a schematic diagram showing a schematic configuration of an input data creation device for powder additive manufacturing according to a second embodiment.

FIG. 12 is a schematic view showing a schematic configuration of an input data creation device for powder additive manufacturing according to a second embodiment. As shown in FIG. 2, an input data creation device 1200 for powder additive manufacturing according to the second embodiment is different from the input data creation device 100 for powder additive manufacturing according to a first embodiment in that the patterning support allowable mechanical quantity input unit 101 and the patterning support removal man-hour input unit 102 are replaced with a patterning support allowable mechanical quantity database 1201 and a patterning support removal man-hour database 1202. The others are the same.

By storing a patterning support allowable mechanical quantity and a patterning support removal man-hour in a database in advance, input by a user for each powder additive manufacturing can be omitted. Accordingly, input data creation processing for powder additive manufacturing is made efficient.

The embodiments described above have been described to aid the understanding of the invention, and the invention is not limited to the specific configurations described. For example, a part of the configuration of the embodiment can be replaced with the configuration of the common technical knowledge of the person skilled in the art, and the configuration of the technical knowledge of the person skilled in the art can be added to the configuration of the embodiment. In other words, in the invention, it is possible to delete/replace other configurations and add other configurations to a part of a configuration of each embodiment of the present specification without departing from the technical idea of the invention.

REFERENCE SIGN LIST

100 . . . input data creation device for powder additive manufacturing, 101 . . . patterning support allowable mechanical quantity input unit, 102 . . . patterning support removal man-hour input unit, 103 . . . product shape and material input unit, 104 . . . support providing surface input unit, 105 . . . manufacturing condition input unit, 106 . . . mechanical quantity calculation unit, 107 . . . support shape determination unit, 108 . . . display unit, 109 . . . input and output unit, 201 . . . powder, 202 . . . laser beam, 203 . . . powder, 601 . . . product shape display, 602 . . . material display, 603 . . . support providing surface display, 604 . . . manufacturing condition display, 605 . . . relationship display between patterning support shape and allowable mechanical quantity, 606 . . . relationship display between patterning support shape and removal man-hour, 607 . . . support removal man-hour minimum selection display, 608 . . . support internal mechanical quantity minimum selection display, 609 . . . next display, 701 . . . plastic deformation-free display, 702 . . . deformation quantity upper limit display, 703 . . . deformation quantity upper limit value display, 704 . . . execution display, 801 . . . support removal man-hour upper limit value display, 802 . . . execution display, 901 . . . product shape display, 902 . . . support providing surface display, 903 . . . mechanical quantity calculation result, 904 . . . optimized support shape, 1001 . . . cylindrical support shape display, 1002 . . . lattice support shape display, 1003 . . . outer diameter parameter display, 1004 . . . inner diameter parameter display, 1101 . . . product having a desired shape, 1102 . . . inappropriate support, 1200 . . . input data creation device for powder additive manufacturing, 1201 . . . patterning support allowable mechanical quantity database, 1202 . . . patterning support removal man-hour database.

The invention claimed is:

1. An input data creation device, for powder additive manufacturing by a powder additive manufacturing device, that creates input data of a model in which a support is provided to a manufacturing designed object in powder additive manufacturing, the input data creation device for powder additive manufacturing comprising:
 a computer coupled to the additive manufacturing device; and
 a display coupled to the computer,
 wherein the computer is programmed to:
 calculate a mechanical quantity generated on a surface to which the support is provided to the manufacturing designed object,
 determine, based on information of a plurality of types of support shapes, information of an allowable mechanical quantity defined for each type of support shape, and the mechanical quantity calculated by the mechanical quantity calculation unit, an optimized type of support shape having an allowable mechanical quantity equal to or greater than the calculated mechanical quantity from among the plurality of types of support shapes,
 upon determining there are a plurality of types of support shapes whose allowable mechanical quantities are equal to or greater than the calculated mechanical quantity, refer to information on a support removal man-hour defined for each type of support shape to make a minimum support removal man-hour as a first condition and make a minimum allowable mechanical quantity as a second condition for determining the optimized type of support shape,
 upon receiving a selection for setting the minimum support removal man-hour, display a first screen on the display displaying a first option to select no plastic deformation and a second option to select a plastic deformation quantity upper limit, and receive an input selecting the first option or the second option,
 upon receiving a selection for setting the minimum allowable mechanical quantity, display a second screen on the display allowing input of a support removal man-hour upper limit value and receive the input of the support removal man-hour upper limit value,
 output at least information indicating the optimized type of support shape to the additive manufacturing device, and manufacture the manufacturing designed object with the optimized type of support shape.

2. The input data creation device for powder additive manufacturing according to claim 1,
 wherein the computer is programmed to, when the optimized type of support shape whose allowable mechanical quantity is equal to or greater than the calculated mechanical quantity does not exist, display information indicating that an optimized type of support shape whose allowable mechanical quantity is equal to or greater than the calculated mechanical quantity does not exist on the display.

3. The input data creation device for powder additive manufacturing according to claim 1,
 wherein the computer is programmed to receive a first input indicating a relationship information between the plurality of types of support shapes and the allowable mechanical quantity for each type of support shape, and
 receive a second input indicating a relationship information between the plurality of types of support shapes and the removal man-hour for each type of support shape, and
 determine the optimized type of support shape based on the received first input and second input.

4. The input data creation device for powder additive manufacturing according to claim 1,
 wherein the computer is programmed to:
 store relationship information between the plurality of types of support shapes and the allowable mechanical quantity for each type of support shape in advance in a first database,
 store relationship information between the plurality of types of support shapes and the removal man-hour for each type of support shape in advance in a second database, and
 determine the optimized type of support shape based on information stored in the first database and the second database.

5. The input data creation device for powder additive manufacturing according to claim 1,
 wherein the computer is programmed to convert information indicating the optimized type of support shape to a data format corresponding to the additive manufacturing device and output the data having the data format to the additive manufacturing device.

* * * * *